April 12, 1966 G. SPEGGIORIN 3,245,506
CONTINUOUS SPEED CHANGE GEAR
Filed Sept. 27, 1963 4 Sheets-Sheet 4

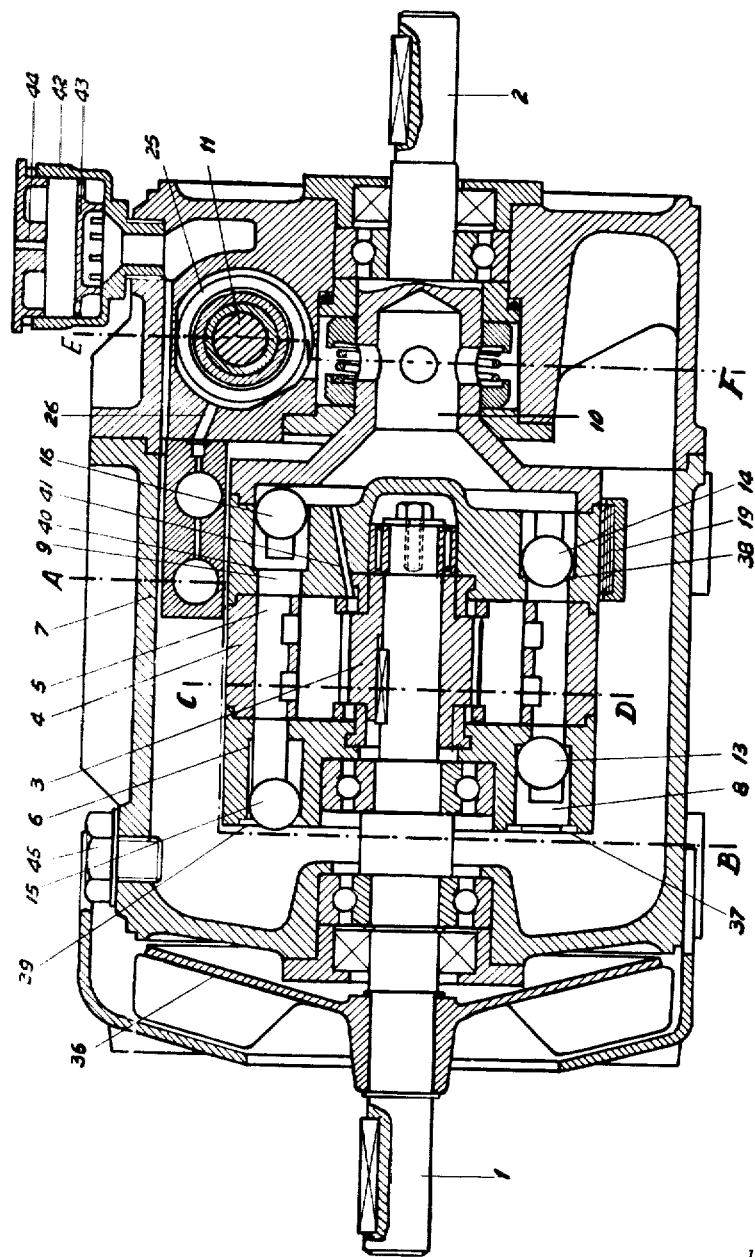

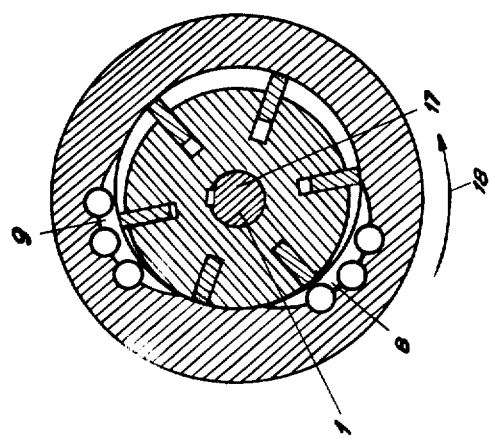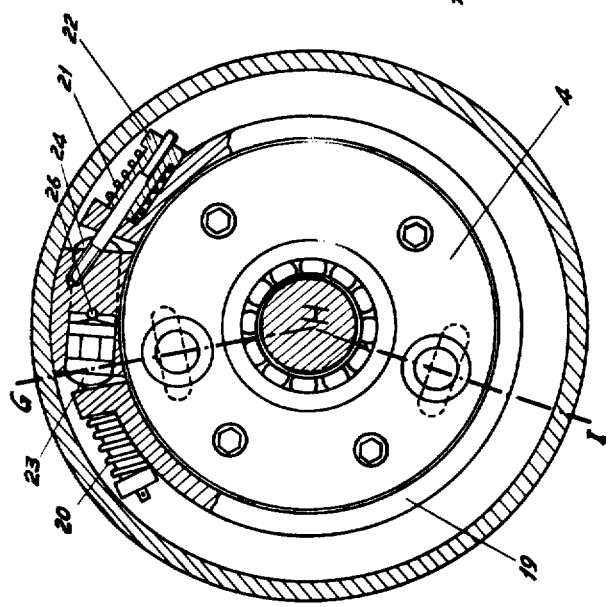

INVENTOR
G. Speggiorin
BY
Richards & Geier
ATTORNEYS

United States Patent Office 3,245,506
Patented Apr. 12, 1966

3,245,506
CONTINUOUS SPEED CHANGE GEAR
Giuseppe Speggiorin, Via Maddalene 1/h,
Vicenza, Italy
Filed Sept. 27, 1963, Ser. No. 312,139
Claims priority, application Italy, Oct. 13, 1962,
20,302/62; June 28, 1963, 13,989/63
3 Claims. (Cl. 192—58)

The present invention concerns a continuous speed change gear, more especially a speed change gear comprising an encased rotary pump having an adjustably fed continuous circulation of liquid.

It is well known that in various practical applications it is extremely advantageous to have a hydro-dynamic continuous speed change device which combines functional flexibility with simplicity of construction, thus permitting, among other things, automatic regulation of the number of revolutions which must remain constant even after abrupt variations of the resistant couple.

Many solutions have been proposed in the past for this purpose without however completely having the above described features.

Continuous speed change gears of mechanical type based on members connected by friction, have, after a certain period of use, very little sensitivity to small changes of speed.

In addition hydro-dynamic speed change gears are also being proposed comprising piston pumps, the course of which can be varied to determine in such manner the variation of the number of revolutions of a driven shaft.

These devices however have the disadvantage of rapid wear due to the presence of components having reciprocal motion and, furthermore, they are of very complicated and expensive construction.

Other types of speed change gears provide for the use of two encased rotary pumps, the first of which acts as a pressure pump and its rotor is connected to the driving shaft whilst the other acts as a hydraulic motor and its rotor is connected to the driven shaft.

The variations of speed are obtained by varying the eccentricity of the pump and consequently the delivery thereof.

These types of speed change gears are also rather complicated in construction and show considerable disadvantages after a certain degree of wear. In addition the constancy of the number of revolutions of the driving shaft is not respected relative to the low numbers of revolutions of the driven shaft.

The object of the present invention is to provide a continuous speed change gear provided with members having only rotary movement which with great facility permit variation of the number of revolutions from zero to a predetermined maximum value, retaining a constant drive couple and also being of very simple and therefore economical construction.

According to the present invention a continuous speed change gear comprises a liquid container within which there is immersed a rotary pump, characterized by the feature that the rotor and the body of the pump are respectively connected to the driving shaft and the driven shaft of the device, keeping the liquid in a closed circuit comprising a control nozzle, the opening of which is adjustable by hand control, the speed of rotation of the driven shaft relative to the driving shaft being adjustable in relationship to the variation of circulation of the liquid in the closed circuit.

The entire pump is immersed in the suitably selected liquid, for example, oil, in a container provided with cooling fins. The liquid circulates in a closed circuit under the action of the pump passing through a valve having an adjustable cross section which defines the rate of delivery, determining in this manner the speed of the driven shaft.

The driven shaft can therefore execute any number of revolutions variable from zero when the valve is completely open to a maximum equal to that of the driving shaft when the valve is completely closed.

In fact when the circulation of the liquid is stopped in this latter case the driving shaft and the driven shaft are rigidly connected together and are forced to rotate at the same speed.

To permit the operation of the speed change gear in both directions of rotation, without the necessity of any manual operation, the encased rotary pump is provided with two separate inlets for the liquid, one of which is open and the other closed by suitable valves, for example, having a movable ball actuated by the same pressure of the liquid.

Another feature of the device consists in the insertion of a braking apparatus which causes a resistant extra couple in the absence of a load on the driven shaft to prevent the latter being rotated by the speed of the liquid when the resistant couple applied thereto is nil or slight.

This extra couple ceases automatically as soon as the pressure of the liquid upstream of the control nozzle has reached a value sufficient to operate the braking device and which is effective automatically when the driven shaft is loaded with a sufficiently high load.

The invention will now be described further, by way of example, with reference to the accompanying drawings in which:

FIG. 1 is a longitudinal section of the device taken on the line G–H–I of FIG. 2;

FIG. 2 is a cross section thereof taken on the line A–B of FIG. 1;

FIG. 3 is a cross section of the rotating pump taken on the line C–D of FIG. 1;

Figure 4:
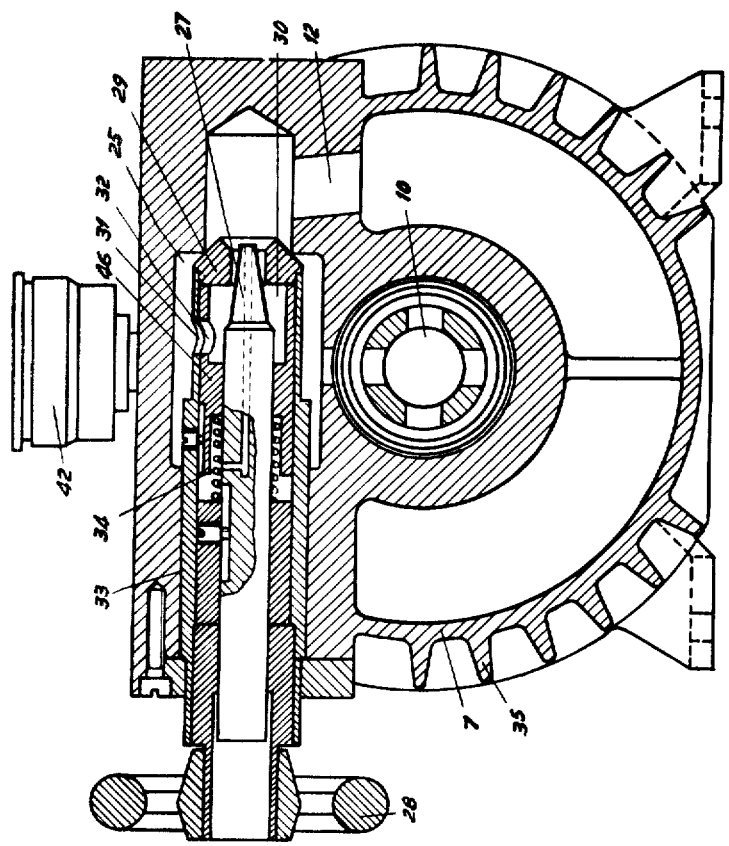
FIG. 4 is a cross section of the device taken on the line E–F of FIG. 1.

The device shown in FIG. 1 comprises a driving shaft 1 and a driven shaft 2. Rigidly connected to the driving shaft 1 is the rotor 3 of the encased rotary pump whilst the body 4 thereof is connected to the driven shaft 2.

The rotary pump is provided with fin 5 located within grooves formed in the rotor 3 and kept in contact with the inner surface of the body 4 by means of the rings 6 and by the pressure of a liquid introduced beneath the fins 5 through the duct 41. The entire pump is immersed in a liquid, for example oil, in the container 7.

The liquid circulates in a closed circuit flowing into the body 4 of the pump through the passage 8, issuing through the ducts 9 and 10 formed in the body and head respectively of the encased pump and then flows into the control valve 11 from which it issues through the passage 12 (FIG. 4) to flow back into the closed area of the container 7. Naturally this is one of the working conditions assumed by the device, corresponding to a predetermined direction of rotation of the rotary pump.

By changing the direction of rotation of the pump the oil flows through the passage 9 to issue from the passage 8. For this purpose the balls 13 and 14 are disposed on the passages 8, 15 and 16 on the passage 9, which balls are automatically displaced under the effect of the pressure or flow of the oil closing or opening the inlets and outlets thereof through the passages 8 and 9.

More precisely the two inlet passages 8 and 9 are disposed on opposite sides of a horizontal plane (FIG. 3) passing through the axis of the driving shaft 1 and the axis 17 of the eccentric inner cavity of the rotary pump.

Each of the passages 8 and 9 may, however, act as an outlet duct for the oil according to the position of the mobile ball valves 13, 14, 15, and 16 (FIG. 1).

It is obvious that when the speed change gear rotates in an anti-clockwise direction with regard to FIG. 3, that is in the direction of the arrow 18, the passage 8 acts as an inlet duct for the fluid and the passage 9 as an outlet duct, whilst in the case where the rotation is in the opposite direction, the passage 9 acts as an inlet duct and the passage 8 as an outlet duct.

In the first case, the fluid taken in through the passage 8 (FIG. 1) causes a depression sufficient to bring the balls 13 and 14 to the position shown in FIG. 1, so that the inlet 37 of the passage 8 remains open, whilst the outlet 38 thereof is closed by the ball 14. The latter is in fact subjected to the external pressure present in the outlet duct 10.

In the passage 9, however, the fluid becomes pressurised propelling the balls 15 and 16 which are displaced outwardly causing the respective closure of the inlet 39 of the passage 9 and the opening of the outlet 40 thereof.

The braking device comprises a resilient strip 19 (FIG. 2) which is wound round the outer body 4 of the rotary pump connected to the driven shaft 2.

The resilient strip 19 is held taut by springs 20 and 21 provided with controller screws 22. It is opened by pistons 23 and 24 actuated by the pressurised fluid coming from the chamber 25 (FIG. 4) of the control valve through the duct 26 (FIG. 1).

Since the pressure of the fluid in the chamber 25 depends on the extent of opening of the control valve and on the resistant couple applied to the driven shaft 2, the springs 20 and 21 are controlled so as to ensure a sufficient braking couple when the control valve is completely open to keep the driven shaft 2 stationary.

As soon as, by the effect of the closing of the control valve, the oil pressure reaches a predetermined value, the pistons 23 and 24 are actuated so as to relieve the braking pressure applied by the resilient strip 19 to the body 4.

From tests which have been carried out it is advisable for the pressure required to counteract the springs 20 and 21 and thus open the resilient strip 19 to correspond to the same pressure which causes the beginning of the movement of piston 46 (FIG. 4) concentric to the needle 27 of the control valve. This is for the purpose of obtaining maximum stability of the number of revolutions of the driven shaft 2 in the presence of abrupt variations of load.

The control valve (FIG. 4) is constituted essentially by the needle 27 which advances under the control of the hand wheel 28 so as to close the outlet nozzle 29. The oil coming from the passage 10 enters the chamber 25 communicating with the space 30 through the bores 31 and 32 formed in the rigid cylinder 33 and a mobile cylinder 46 respectively, the cylinder 46 being internal and coaxial with the cylinder 33.

The cylinder 46 is displaceable internally of the fixed cylinder 33 and coaxially to the needle 27 overcoming the action of the spring 34. In this manner the discharge of the oil is automatically controlled for the purpose of keeping constant the number of revolutions of the driven shaft 2, even in the event of sudden load increases.

In fact in the case of the needle 27 completely closing the nozzle 29, the circulation of the oil is blocked and the driven shaft 2 is rigidly connected to the driving shaft 1.

In the opposite case in which the needle 27 is in a position of maximum opening of the nozzle 29, the maximum delivery rate of oil is obtained in the rotary pump whilst the driven shaft 2 is stopped by the braking device comprising the resilient strip 19 as no oil pressure is built up in the chamber 25 to actuate the pistons 23 and 24.

In any other intermediate position of the needle 27 the driven shaft 2 is given a number of revolutions intermediate between zero and the number of revolutions of the driving shaft 1.

Therefore continuous and regular control of the speed is possible by means of a hand wheel 28 which controls the longitudinal displacements of the needle 27.

In the case of which a sudden increase in the resistant couple on the driven shaft 2 occurs, the couple has a reduction in the number of revolutions and hence an increase in the delivery rate of oil from the rotary pump and consequently an increase in the pressure of the oil in the space 30 which is disposed in front of the outlet nozzle 29.

As a result of this the piston 46 is displaced overcoming the reaction of a spring 34 and partly closing the bore 31 which admits oil into the space 30.

The delivery of the oil is automatically reduced and consequently the driven shaft reassumes its normal speed.

Obviously all this occurs on the assumption that the driving shaft 1 has a constant speed even following severe variations of the resistant couple.

Naturally the variations in the speed of the driven shaft 2 comprise variations in the yield and consequently variations in the loss of power of the device, which power is transformed into heat with consequent heating of the liquid.

For this reason the container 7 (FIG. 4) of the device is provided with cooling fins 35 whilst a rotating fan 36 (FIG. 1) keyed to the driving shaft ensures efficient cooling.

The container 7 is provided with an opening 42 for loading the oil with an anti-splash diaphragm 43 and a breathing aperture 44.

If desired it may be located in the position of the screw plug 45.

Figure 5:
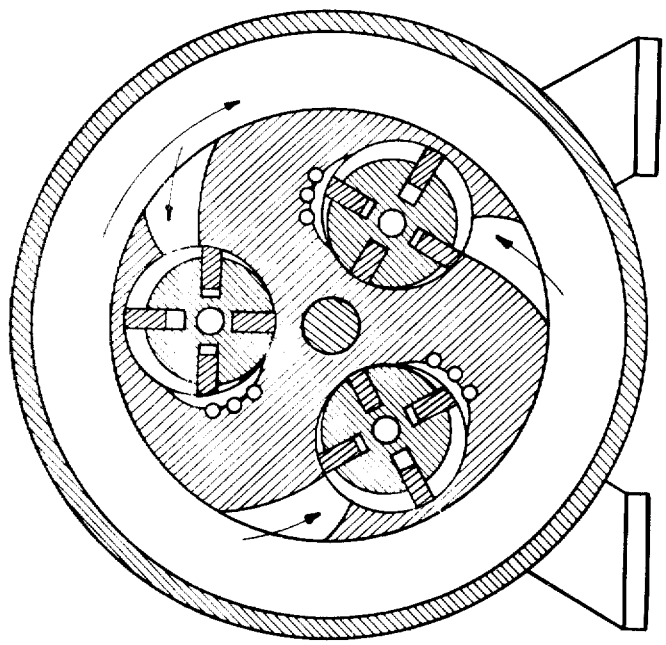
FIG. 5 is a schematic cross sectional view of a multiple pump device.

As a variation it is possible for a plurality of rotary pumps to be contained in the rotor of the speed change gear, for example 3 as shown in FIG. 5, each being disposed with its axis parallel to the central axis of the machine and equidistant therefrom. In this case the rotor will be provided with as many cylindrical cavities as there are rotary pumps. Within each cavity will be disposed the rotating eccentric drum of the encased pump provided with radial fins.

Figure 6:
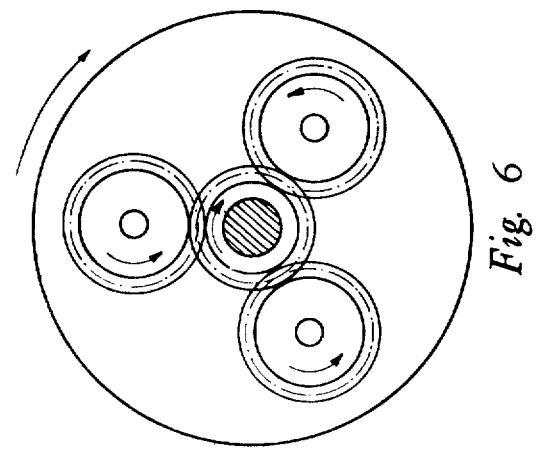
FIG. 6 shows the kinetic connection of the rotors of the pump.

The above mentioned rotating drums are connected by means of a mechanical connection, for example constituted by a group of gears (FIG. 6) connected to the central shaft of the machine which will set them in rotation. This arrangement of multiple pumps is particularly advantageous in the case of speed change gears provided for very high powers.

What is claimed is:

1. A continuous speed change gear, comprising a driving shaft, a driven shaft, a casing adapted to receive a circulating liquid, a pump located within said casing and having a rotor connected with said driving shaft, and a body enclosing said rotor and connected with said driven shaft, said pump forming a closed circuit for said circulating liquid; a control nozzle device within said circuit, said control nozzle device having a needle having a cylindrical portion and a conical head, a nozzle having the same cross-section as said head and adapted to receive said head, a cylinder movably mounted upon the cylindrical portion of said needle and having a portion enclosing an outlet aperture adapted to communicate with the interior of said nozzle and constituting a part of said circuit, said portion of the cylinder having an inlet bore, a rigid cylinder enclosing said movable cylinder and having an inlet bore adapted to communicate with the inlet bore of the movable cylinder, said two bores also constituting a part of said circuit, a spring engaging said movable cylinder and adapted to maintain said movable cylinder in a position in which said two bores are in alinement, and manually operable means connected with said needle, whereby an adjustment in the operative size of said outlet aperture varies the delivery of said pump and thereby permits fine continuous adjustment of the speed of said driven shaft.

2. A continuous speed change gear, comprising a driving shaft, a driven shaft, a casing adapted to receive a circulating liquid, a pump located within said casing and having a rotor connected with said driving shaft, and a body enclosing said rotor and connected with said driven shaft, said body having two openings on opposite sides of its axis through which said liquid enters into and emerges from the pump, displaceable valves actuated by liquid pressure for closing any one of said openings depending upon direction of rotation of said rotor, thereby permitting operation in both directions of rotation, said pump forming a closed circuit for said circulating liquid; a control nozzle device within said circuit, and manually operable means actuating said control nozzle to vary the circulation of said liquid in said circuit and thereby vary the speed of said driven shaft relatively to said driving shaft.

3. A continuous speed change gear, comprising a driving shaft, a driven shaft, a casing adapted to receive a circulating liquid, a pump located within said casing and having a rotor connected with said driving shaft, and a body enclosing said rotor and connected with said driven shaft, said pump forming a closed circuit for said circulating liquid; a resilient braking strip enclosing said body, springs connected with said strip and pressing it against said body, hydraulic pistons connected with said strip, a control nozzle device within said circuit and having means supplying liquid to said pistons to move them in directions opposite to the directions of pressure of said springs, whereby a braking effect is exerted by said control nozzle device on said driven shaft, and manually operable means actuating said control nozzle to vary the circulation of said liquid in said circuit and thereby vary the speed of said driven shaft relatively to said driving shaft.

References Cited by the Examiner
UNITED STATES PATENTS

| Re. 22,577 | 12/1944 | Thomas | 192—61 |
| Re. 23,342 | 2/1951 | Dikeman | 192—61 X |
| 2,195,619 | 4/1940 | Cumbus et al. | 192—61 |

DAVID J. WILLIAMOWSKY, *Primary Examiner.*

DON A. WAITE, *Examiner.*

A. T. McKEON, *Assistant Examiner.*